United States Patent [19]

Yamamoto et al.

[11] Patent Number: 4,790,655
[45] Date of Patent: Dec. 13, 1988

[54] SYSTEM FOR MEASURING LASER SPECTRUM

[75] Inventors: Shu Yamamoto, Chofu; Kiyofumi Mochizuki, Hachioji, both of Japan

[73] Assignee: Kokusai Denshin Denwa Kabushiki Kaisha, Tokyo, Japan

[21] Appl. No.: 859,993

[22] Filed: May 5, 1986

[30] Foreign Application Priority Data

May 15, 1985 [JP] Japan .................................. 60-101486

[51] Int. Cl.[4] ................................................ G01B 9/02
[52] U.S. Cl. ...................................... 356/345; 356/346
[58] Field of Search ........................ 356/345, 346, 349; 250/227; 350/96.15

[56] References Cited

U.S. PATENT DOCUMENTS 4,530,097 7/1985 Stokes et al. ...................... 350/96.15

OTHER PUBLICATIONS

Kikuchi et al., "High Resolution Measurement of the Spectrum of Semiconductor Lasers", Japanese Annual Review, Computers, Telecomm., 1982.

Primary Examiner—Davis L. Willis
Assistant Examiner—Matthew W. Koren
Attorney, Agent, or Firm—Emmanuel J. Lobato; Robert E. Burns

[57] ABSTRACT

A system for measuring laser spectrum is disclosed in which the laser light to be measured is branched into one branched light and the other branched light so that the laser spectrum of the light is measured from a beat output resulting from mixing a delayed light obtained by delaying the one branched light for a certain period of time with the other branched light undelayed. In accordance with the present invention, the delay time of the delayed light undergoes such variations as to assume a value equal to an integral multiple of a fixed delay time by the use of an optical directional coupler.

4 Claims, 2 Drawing Sheets

SYSTEM FOR MEASURING LASER SPECTRUM

BACKGROUND OF THE INVENTION

The present invention relates to improvements in a system for measuring the spectral distribution of a lightwave signal such as a semiconductor laser.

The spectrum of a semiconductor laser has heretofore been measured by spectrometry through use of a spectrometer and a Fabry-Perot interferometer. Now that the spectral width of the semiconductor laser has been improved, however, the resolution for measurement with such spectrometry is insufficient. One possible high-resolution measuring method is a heterodyne method which utilizes a beat signal of two laser lights. This method is defective in that the light frequency of a reference local oscillation laser must be close to the frequency of the semiconductor laser under test and must be extremely stabilized.

On the other hand, there has been proposed a self-delay heterodyne or homodyne method according to which a portion of the laser output light to be measured is delayed to equivalently produce two independent laser lights mutually equal in the statistic property of their frequency fluctuation and the spectrum of a beat signal of these two laser lights, that is, the delayed light and the undelayed light, is measured, whereby the spectral distribution of the semiconductor laser is measured (Kikuchi, Ohkoshi and Nakayama, "A Novel Method of High-Resolution Measurement of Spectrum of Semiconductor Lasers", Institute of Electronics and Communication Engineers of Japan, Technical Meeting Report on OptoQuantum Electronics, OQE 80-50, 1980).

As described above, according to the prior art, a high-resolution measurement of the spectral distribution of a semiconductor laser requires lengthening of the optical fiber delay line, resulting in the shortcoming that the measuring instrument inevitably becomes bulky.

Especially, with the recent improvement of the performance of the semiconductor laser, there has been a strong demand for a system which permits a high-resolution measurement of the spectral distribution with a small instrument, but no specific techniques therefor have been proposed so far.

SUMMARY OF THE INVENTION

In view of the above-mentioned defect of the prior art, an object of the present invention is to provide a system for measuring laser spectrum which permits a high-resolution measurement of the spectral distribution with a measuring instrument of small size.

The system for measuring the optical spectrum of the present invention, which branches the light to be measured into two, delays one of the two branched output lights for a certain period of time, combines the delayed light with the other undelayed light, and measures the spectrum of the light from the resulting beat output, is characterized by an arrangement in which the delay time of the delayed light undergoes such variations as to assume a value equal to an integral multiple of a fixed delay time.

BRIEF DESCRIPTION OF THE DRAWINGS

The present invention will be described in detail below in comparison with prior art with reference to the accompanying drawings, in which.

DETAILED DESCRIPTION

To make differences between prior art and the present invention clear, examples of prior art will first be described.

Figure 1:
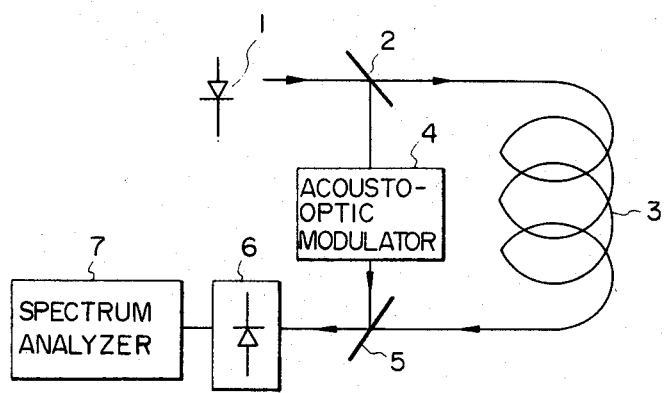
FIG. 1 is a diagram showing the arrangement of a conventional self-delay heterodyne system.

FIG. 1 is a diagrammatic showing of the conventional self-delay heterodyne system. The output light of a semiconductor laser 1 is split by a beam splitter 2 into two, beams one of them is delayed by a single-mode optical fiber delay line 3 for a certain period of time, the other beam is frequency-shifted by an acoustooptic modulator 4, both lights or beams are combined by an optical coupler 5, and their beat is detected by a photodetector 6. When the delay time by the optical fiber delay line 3 is sufficiently longer than the coherence time of the semiconductor laser, which is a measure representing the spectrum purity of a light source and increases as the spectral width of the output light decreases the combined two lights have no correlation with each other and their frequency noises are mutually equal in terms of statistical property; so that the beat of the photodetector 6 is observed by a spectrum analyzer 7. The observed power spectrum is a spectral distribution which spreads twice as large as the spectrum of the semiconductor laser output light.

The resolution $\Delta f$ of this measuring method is determined by the following equation:

$$\Delta f = (0.75/\pi \cdot \tau_d) \tag{1}$$

Where $\tau_d$ is the delay time given by the single-mode optical fiber delay line 3. Letting the length of the optical fiber delay line 3, the refractive index of the optical fiber delay line 3 and the velocity of light in a vacuum be represented by l, n and c, respectively, the delay time can be obtained by $$\tau_d = (l/c/n) = (l \cdot n/c) \tag{2}$$

Accordingly, substitution of Eq. (2) into Eq. (1) gives $$\Delta f = (0.75c/\pi \cdot l \cdot n) \tag{3}$$

Therefore, improvement of the resolution $\Delta f$ (i.e. the reduction of $\Delta f$) calls for an increase in the length l of the optical fiber delay line.

For instance, assuming that $c = 3 \times 10^8$ [m/s], $n = 1.5$ and $l = 1.5$ [km] in FIG. 1, the resolution $\Delta f$ will be about 30 KHz. Conversely, the 30 KHz resolution $\Delta f$ cannot be achieved unless the single-mode optical fiber delay line 3 is as long as 1.5 km.

Figure 2:
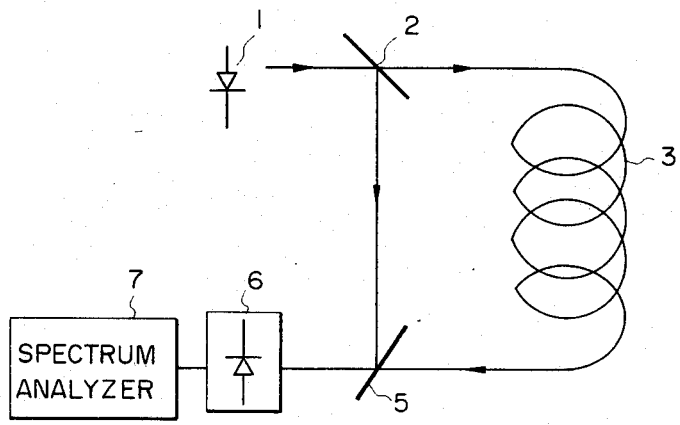
FIG. 2 is a diagram showing the arrangement of another conventional self-delay homodyne system.

FIG. 2 is a diagrammatic representation of the conventional self-delay homodyne method, in which the acoustooptic modulator 4 in FIG. 1 is removed. With the method shown in FIG. 2, since the undelayed light is not frequency-shifted, the beat of the combined light by the optical coupler 5 becomes homodyne and the power spectrum which is observed by the spectrum analyzer 7 is a spectrum folded at the frequency 0. The spectral distribution in this case is as small as half as the power spectral distribution obtainable with the method of FIG. 1, but this method measures the spectral distribution of the semiconductor laser output through utilization of the symmetry of the spectrum.

However, this self-delay homodyne system also calls for an increase in the length l of the optical fiber delay line for improving the resolution $\Delta f$.

With reference to the accompanying drawings, the present invention for eliminating the above defects of prior art will hereinafter be described in detail.

(EXAMPLE 1)

Figure 3:
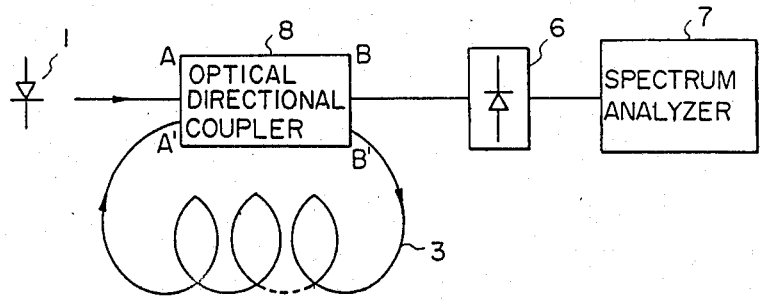
FIG. 3 is a diagram illustrating an example of the arrangement of the light spectrum measuring system of the present invention.

FIG. 3 is a diagram illustrating an embodiment of the present invention applied to the self-delay homodyne method.

Reference numeral 1 indicates a semiconductor laser for generating a signal to be measured. The output light of the semiconductor laser 1 is applied to an input terminal A of a 2 input-2 output optical directional coupler 8 (hereinafter referred to as the "coupler"), from which the output light is obtained at output terminals B and B'. The optical signal derived from the output terminal B' passes through the delaying single-mode optical fiber 3 (hereinafter referred to simply as the "optical fiber 3") serving as a delay line, wherein it is delayed for the time $\tau_d$ obtainable from Eq. (3). The optical signal thus subjected to the first delay is applied to the other input terminal A' of the coupler 8. A portion of the signal is output to the output terminal B and the other remaining portion is output to the output terminal B', and hence is delayed by the optical fiber 3. The optical signal is repeatedly applied to the delay line until desired resolution of the spectrum is obtained. In this case, when the delay time $\tau_d$ is long enough to obtain the desired resolution, the light delayed by the optical fiber 3 and the output light of the semiconductor laser 1 (hereinafter referred to as the "undelayed light") are combined with each other so that their beat is detected by the photodetector 6, after which the spectral distribution is measured by the RF spectrum analyzer 7.

The branching ratio of the coupler 8 need only to be selected so that the branched output lights or beams are substantially equal to each other or loosely coupled so as to minimize the beat component.

For instance, in a case where the length l of the optical fiber 3 is of 0.5 [km] and the refractive index n of the optical fiber 3 is 1.5, a delay time $\Delta_{dl}$ which is provided by one passage through the optical fiber 3 is given as follows:

$$\tau_{dl} = \frac{l}{c/n} = \frac{l \cdot n}{c} = \frac{5 \times 10^2 \times 1.5}{3 \times 10^8} \approx 2.5 \ [\mu s] \quad (4)$$

Therefore, resolution $\Delta f_1$ which is obtained by one passage through the optical fiber 3 becomes as follows:

$$\Delta f_1 = \frac{0.75}{\pi \cdot \tau_{dl}} = \frac{0.75}{\pi \times 2.5 \times 10^{-6}} \approx 96 \ [KHz] \quad (5)$$

and resolution $\Delta f_N$ obtainable by N passages through the optical fiber 3 is as follows:

$$\Delta f_N = (96/N) \ KHz \quad (6)$$

Taking into consideration the output power of the semiconductor laser 1 and the measuring accuracy of the spectrum analyzer 7, the maximum number of passages through the optical fiber 3 is seven to eight at present.

While in the above example the length l of the optical fiber 3 is described to be of 0.5 [km], the length of the optical fiber can be preset as desired.

Moreover, the resolution can be further improved by inserting between the semiconductor laser 1 and the directional optical coupler 8, or between the directional optical coupler 8 and the photodetector 6 at least one more set of an optical fiber 3a different in length from the optical fiber 3 and another directional optical coupler 8a, though not shown.

As described above, according to the present invention, the resolution which is obtainable in dependence upon a predetermined length of the delay line can be varied by 1/N the number N of passages through the delay line, enabling high-resolution spectrum measurement with a small instrument.

(EXAMPLE 2)

Figure 4:
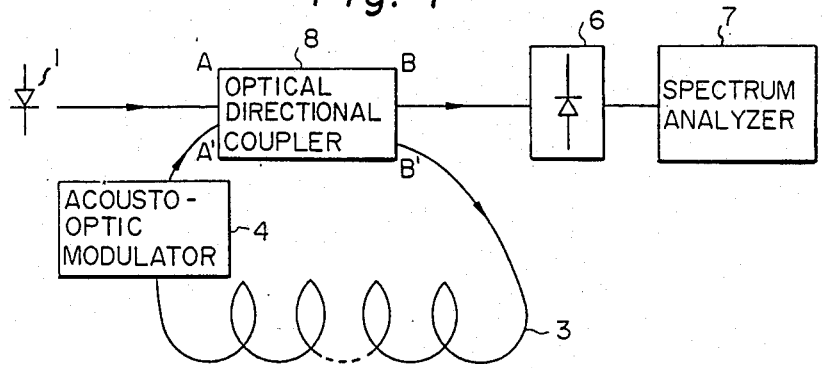
FIG. 4 is a diagram illustrating an example of the self-delay heterodyne system of the present invention.

FIG. 4 is a diagram illustrating another embodiment of the present invention applied to the self-delay heterodyne method. In FIG. 4 an acoustooptic modulator 4 (hereinafter referred to as "AO modulator") similar to that employed in FIG. 1 is inserted at the output side of the optical fiber 3 serving as the delay line in Example 1. The other portions are exactly identical in construction with those in FIG. 3.

The output light of the semiconductor laser 1 is applied to the input terminal A of the coupler 8. The one portion of the light is provided directly from the output terminal B to the photodetector 6 and the other portion of the light is applied from the output terminal B' to the optical fiber 3, wherein it is delayed for a period of time dependent upon the length of the fiber, thereafter being frequency-shifted by the modulation frequency of the AO modulator 4 and applied to the input terminal A' of the coupler 8. The first delayed light thus provided to the input terminal A' is branched again by the coupler 8 into two, one of which is led to the output terminal B in addition to the input light from the input terminal A, and the other of which is applied again to the optical fiber 3 and delayed. Such operations are repeated by N times until the desired resolution $\Delta f$ is obtained, after which the delayed light is applied to the photodetector 6 in addition to the output light of the semiconductor laser 1, thereby detecting the beat component. At this time, N beat components are detected from the first to N-th delayed lights and each undelayed light, but the beat component by the N-th delayed light and undelayed light is shifted by the modulation frequency of the AO modulator 4, so that by measuring its beat spectrum with the spectrum analyzer 7, the spectral distribution can be measured with the desired resolution $\Delta f$. In this instance, a beat of the delayed lights from the optical fiber 3 is also produced; but, by selecting the branching ratio of the coupler 8 so that the output lights at the output terminals B and B' are substantially equal to each other or loosely coupled, as mentioned previously, the beat of the undelayed light and each delayed light increases, making negligible the beat between the delayed lights.

As described above, the present invention is applicable to the self-delay heterodyne method as well.

(EXAMPLE 3)

Figure 5:
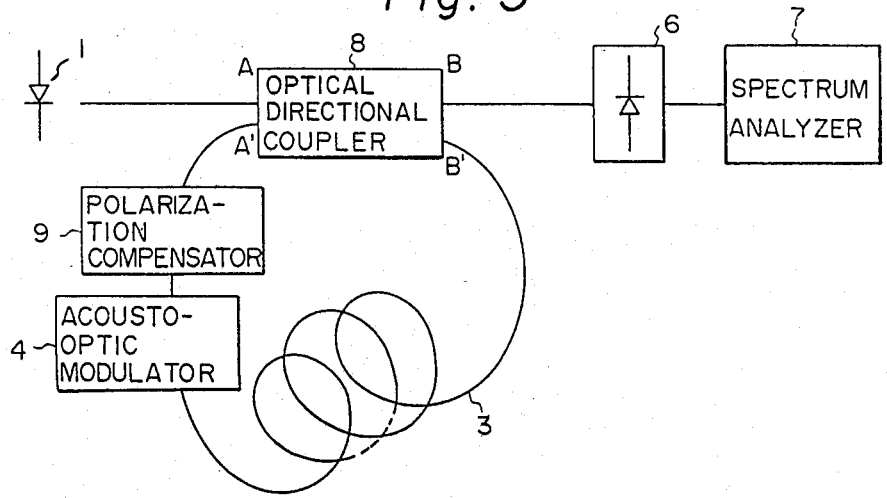
FIG. 5 is a diagram illustrating another embodiment of the present invention in which a polarization compensator is employed in the selfdelay heterodyne system.

FIG. 5 illustrates another embodiment of the present invention, in which a polarization compensator 9 is inserted in the optical fiber 3 acting as a delay line in the self-delay heterodyne method described above with respect to FIG. 4.

It is known in the art that light propagating in an ordinary optical fiber does not retain its initial polarized state. Accordingly, the delayed light by the optical fiber 3 in the present invention differs in the plane of polarization from the output light of the semiconductor laser 1. Therefore, even if the undelayed light and the delayed light of different planes of polarization are combined with each other, the beat component is weak. To improve this, the present invention further provides the polarization compensator 9 at the output side of the optical fiber 3 of the delay line, by which the delayed light having passed through the optical fiber 3 is always matched with the undelayed light to have the same plane of polarization. Accordingly, since the beat of the polarization-matched lights is stronger than the beat of polarization-mismatched lights, the present invention enables the beat component to be detected efficiently.

Although FIG. 5 illustrates the arrangement in which the polarization compensator 9 is utilized in the self-delay heterodyne method alone, the polarization compensator 9 may preferably be used as well in the self-delay homodyne method described previously with regard to FIG. 3.

Furthermore, while in the above the planes of polarization of the undelayed light and the delayed light are matched with each other by the use of the polarization compensator 9, it is also possible to substrate the optical fiber 3 of the delay line with an optical fiber which preserves the plane of polarization.

As described above, the present invention enables desired resolution to be obtained by equivalently changing the length of the delay line and permits marked reduction of the measuring instrument as compared with that used in the conventional measuring systems, and hence is of great utility in practice.

What we claim is:

1. In a system for measuring a laser spectrum in which a laser output light to be measured is branched into one light branch and another light branch and having means including a spectrum analyzer so that the laser spectrum of the output light is measured from a beat output resulting from mixing a delayed light obtained by delaying the one light branch for a certain period of time with said another light branch undelayed, the improvement comprising optical directional control means for optically controlling delay time of the delayed light branch by repetitive passage thereof along a constant length path thereof effective so that the delay time thereof undergoes such variations as to assume a value equal to an integral multiple of a predetermined fixed delay time effective to obtain a desired resolution of the laser spectrum.

2. A system for measuring a laser spectrum according to claim 1, in which said optical directional control means comprises an optical directional coupler having a first light path from a first input to a first output thereof and a second light path from a second input to a second output thereof, said optical directional coupler effecting coupling of said first light path and a second light path with each other at an appropriate coupling rate, an optical fiber delay line connected between the second input and the second output, and said beat being obtained at said first output.

3. A system for measuring a laser spectrum according to claim 2, in which an acousto-optic modulator is inserted in said optical fiber delay line.

4. A system for measuring a laser spectrum according to claim 2, in which an acousto-optic modulator and a polarization compensator are serially inserted in said optical fiber delay line.

* * * * *